(12) United States Patent
Choi et al.

(10) Patent No.: US 9,057,474 B2
(45) Date of Patent: Jun. 16, 2015

(54) ROBOT USING MULTI-OUTPUT DIFFERENTIAL GEAR

(71) Applicant: Research & Business Foundation SUNGKYUNKWAN UNIVERSITY, Suwon-si (KR)

(72) Inventors: Hyouk Ryeol Choi, Gunpo-si (KR); Homoon Kim, Bucheon-si (KR); Jung Seok Suh, Suwon-si (KR); Yun Seok Choi, Seoul (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 14/062,269

(22) Filed: Oct. 24, 2013

(65) Prior Publication Data

US 2014/0123800 A1 May 8, 2014

(30) Foreign Application Priority Data

Oct. 26, 2012 (KR) ........................ 10-2012-0119369

(51) Int. Cl.
| | |
|---|---|
| *F16H 37/06* | (2006.01) |
| *F16L 55/30* | (2006.01) |
| *F16H 48/10* | (2012.01) |
| *F16H 37/08* | (2006.01) |

(52) U.S. Cl.
CPC ............... *F16L 55/30* (2013.01); *Y10S 901/25* (2013.01); *Y10T 74/20317* (2013.01); *F16H 37/08* (2013.01); *F16H 48/10* (2013.01)

(58) Field of Classification Search
USPC .................................................. 475/332, 341
See application file for complete search history.

(56) References Cited

U.S. PATENT DOCUMENTS

| | | | | | |
|---|---|---|---|---|---|
| 2,796,943 | A | * | 6/1957 | Rolt et al. ..................... | 180/249 |
| 2,851,905 | A | * | 9/1958 | Clark, Jr. ......................... | 475/6 |
| 4,938,167 | A | * | 7/1990 | Mizuho et al. ................. | 118/713 |
| 5,042,610 | A | * | 8/1991 | Shiraishi et al. .............. | 180/249 |
| 7,505,063 | B1 | * | 3/2009 | Bastedo et al. ................. | 348/84 |
| 2002/0102136 | A1 | * | 8/2002 | Holland ..................... | 405/184.1 |
| 2004/0099175 | A1 | * | 5/2004 | Perrot et al. ............... | 104/138.1 |
| 2012/0197440 | A1 | * | 8/2012 | Farkavec et al. ............. | 700/264 |

FOREIGN PATENT DOCUMENTS

| | | |
|---|---|---|
| KR | 10-0784932 B1 | 12/2007 |
| KR | 10-2010-0064701 A | 6/2010 |
| KR | 10-2011-0073701 A | 6/2011 |

* cited by examiner

*Primary Examiner* — Ramya Burgess
*Assistant Examiner* — David Morris
(74) *Attorney, Agent, or Firm* — NSIP Law

(57) ABSTRACT

A robot uses a multi-output differential gear to generate outputs. The robot includes a driver; a differential gear configured to receive a driving power from the driver, and to drive in an interlocked manner with the driving power to generate at least three outputs differentiated from the driving power; and a motion section configured to drive in an interlocked manner with an output generated from the differential gear, and to apply an external resistance to the differential gear.

16 Claims, 14 Drawing Sheets

(a)

(b)

ROBOT USING MULTI-OUTPUT DIFFERENTIAL GEAR

CROSS-REFERENCE TO RELATED APPLICATION

This application claims the benefit of priority under 35 U.S.C. §119(a) of Korean Patent Application No. 10-2012-0119369, filed on Oct. 26, 2012, in the Korean Intellectual Property Office, the entire disclosure of which is incorporated herein by reference for all purposes.

BACKGROUND

1. Field

The following description relates to a robot using a multi-output differential gear, for example, a robot using a multi-output differential gear capable of generating a plurality of outputs using one driver and of changing each output flexibly according to changes in movement paths.

2. Description of Related Art

Plumbing facilities are one of various infrastructures in industries, and are being established as supply routes for various energy resources as they are being distributed here and there nationwide like blood vessels in a human body. However, these plumbing facilities are mostly buried underground, and thus there is much difficulty in inspecting and replacing them when the inner walls are corroded after a certain period of time or damaged by external environmental conditions.

As such, plumbing facilities are continuously wearing out, and various defects that occur in this process are causing small and large plumbing related accidents every year. However, insufficient manpower and technology makes it difficult to conduct systematic and regular inspections on the plumbing facilities.

In this regard, robots that are capable of inspecting inside the plumbing have been developed, and various researches are being conducted as well. However, conventional robots had to be equipped with a driver (actuator) for every wheel to adjust the movement state of each wheel separately according to the shape of the plumbing, thereby increasing the size of the robots.

As a result, there is a necessity for robots capable of adjusting the speed of each motion section according the shape of the plumbing using just one driver.

SUMMARY

Therefore, a purpose of the present disclosure is to resolve the aforementioned problems of prior art, that is, to provide a robot using a multi-output differential gear, the robot capable of generating a plurality of outputs through one driver and transmitting the generated outputs to each motion section.

Another purpose of the present disclosure is to provide a robot using a multi-output differential gear that can drive stably even when there are changes in movement paths.

In one general aspect, there is provided a robot using a multi-output differential gear, the robot comprising: a driver; a differential gear configured to receive a driving power from the driver, and to drive in an interlocked manner with the driving power to generate at least three outputs differentiated from the driving power; and a motion section configured to drive in an interlocked manner with an output generated from the differential gear, and to apply an external resistance to the differential gear.

In the general aspect of the robot, the differential gear may comprise: a first output gear configured to receive a driving power from the driver and to generate a first output having a different rotary speed from the driver when receiving an external resistance, and a middle gear configured to drive in an interlocked manner with the first output gear to generate a middle output; and a second differential gear configured to receive the middle output from the first differential gear and to generate a second output having a different rotary speed from the middle output when receiving an external resistance, and a third output gear configured to drive in an interlocked manner with the second output gear to generate a third output having a different rotary speed from the second output.

In the general aspect of the robot, the first output gear may be provided with sawteeth in its inner circumference, the middle gear may be provided inside of and distanced from the first output gear, and the first differential gear may further comprise a plurality of first epicyclic gears configured to engage an inner circumference of the first output gear and an outer circumference of the middle gear at the same time.

In the general aspect of the robot, the second output gear and third output gear may be provided with sawteeth in their inner circumferences, and the second differential gear may further comprise a plurality of second epicyclic gears engaging an inner circumference of the second output gear and driving in an interlocked manner with the second output gear; and a third epicyclic gear engaging an inner circumference of the second epicyclic gear and third output gear at the same time to rotate in an interlocked manner with the second epicyclic gear and third output gear.

In the general aspect of the robot, at least one of the first output gear, second output gear, and third output gear may be provided with sawteeth in its outer circumference, and the sawteeth provided in an outer circumference of at least one of the first output gear, second output gear, and third output gear may drive in an interlocked manner with the motion section to receive an external resistance.

In the general aspect of the robot, the motion section may comprise a first motion section configured to drive in an interlocked manner with the first output gear and apply an external resistance to the first output gear, a second motion section configured to drive in an interlocked manner with the second output gear and apply an external resistance to the second output gear, and a third motion section configured to drive in an interlocked manner with the third output gear and receive a third output from the second output gear.

In the general aspect of the robot, the motion section may consist of three motion sections each distanced by 120° from one another around a central axis of the differential gear.

In the general aspect of the robot, at least one of the first motion section, second motion section, and third motion section may consist of a pair of motion sections extended from an outer surface of the differential gear and distanced from each another along a longitudinal direction of the differential gear.

In the general aspect of the robot, the robot may further comprise a body section mounted to an outer surface of the differential gear to protect the differential gear.

In the general aspect of the robot, the robot may further comprise a camera module mounted to a front portion of the body section.

In the general aspect of the robot, the robot may further comprise a buffering section between the motion section and the differential gear, the buffering section configured to adjust a distance between the motion section and the differential gear so that the motion section in order to keep the motion section contacting the motion surface.

In the general aspect of the robot, the robot may further comprise a buffering adjuster interlocked with the buffering section and adjusts an initial distance between the motion section and the differential gear.

Other features and aspects may be apparent from the following detailed description, the drawings, and the claims.

Figure 1:
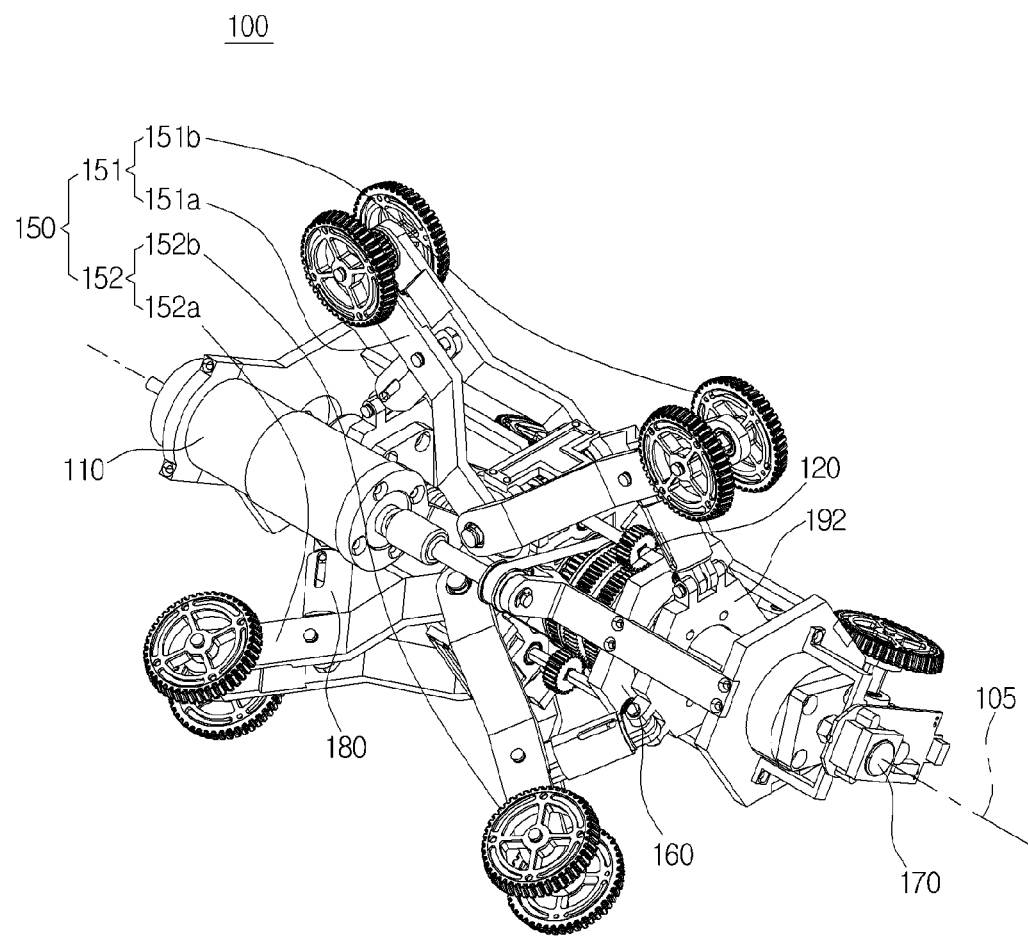
FIG. 1 is a schematic view of a robot using a multi-output differential gear according a first exemplary embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustrating, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Hereinbelow is a detailed explanation on a robot using a multi-output differential gear according to first exemplary embodiment of the present disclosure 100 with reference to the drawings.

For convenience of explanation, the following explanation is based on an assumption that a robot using a multi-output differential gear according to a first exemplary embodiment of the present disclosure 100 is an in-pipe robot configured to move inside a pipe.

However, a robot using a multi-output differential gear according to a first exemplary embodiment of the present disclosure 100 is not limited to in-pipe robots, but may also be utilized in various ways for robots configured to enter an inner space that may not easily be entered by humans to inspect for destruction of the inner space, to transport a certain item to the inner space, or to fix the inner space etc.

Figure 2:
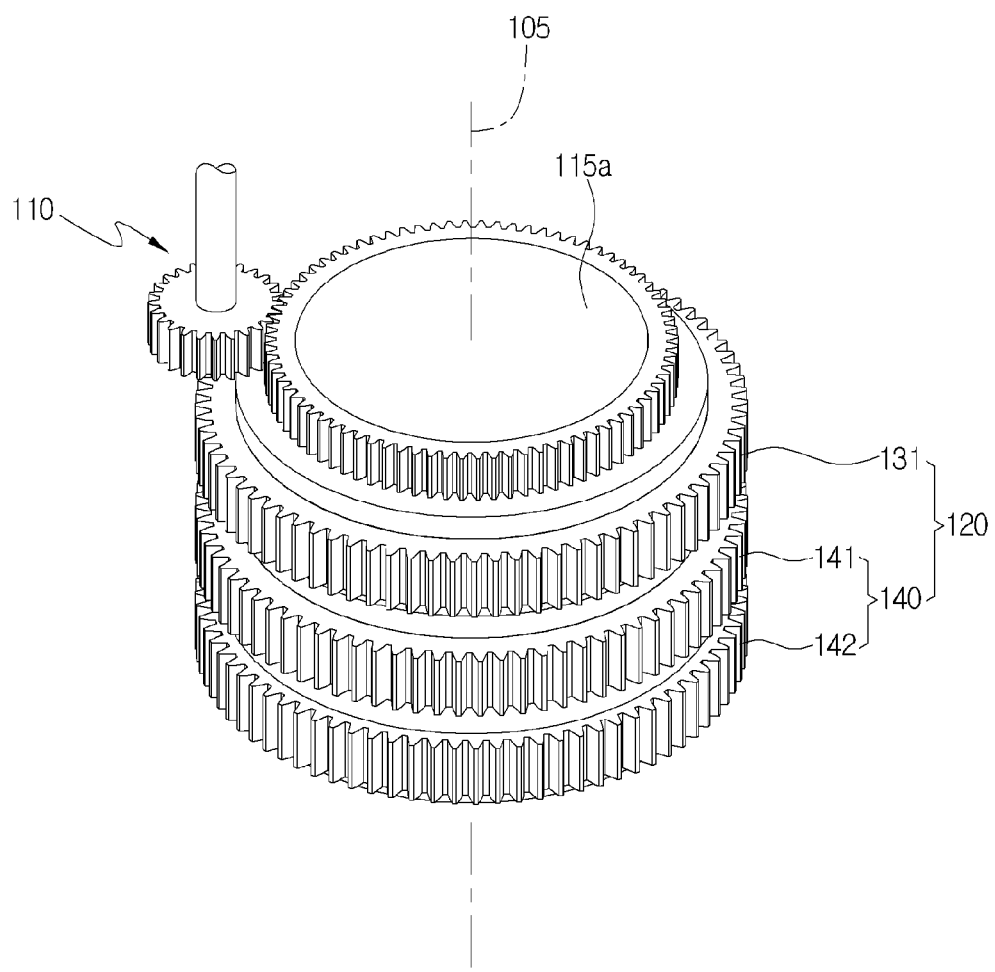
FIG. 2 is a schematic skewed view of a differential gear of a robot using a multi-output differential gear of FIG. 1.
Figure 3:
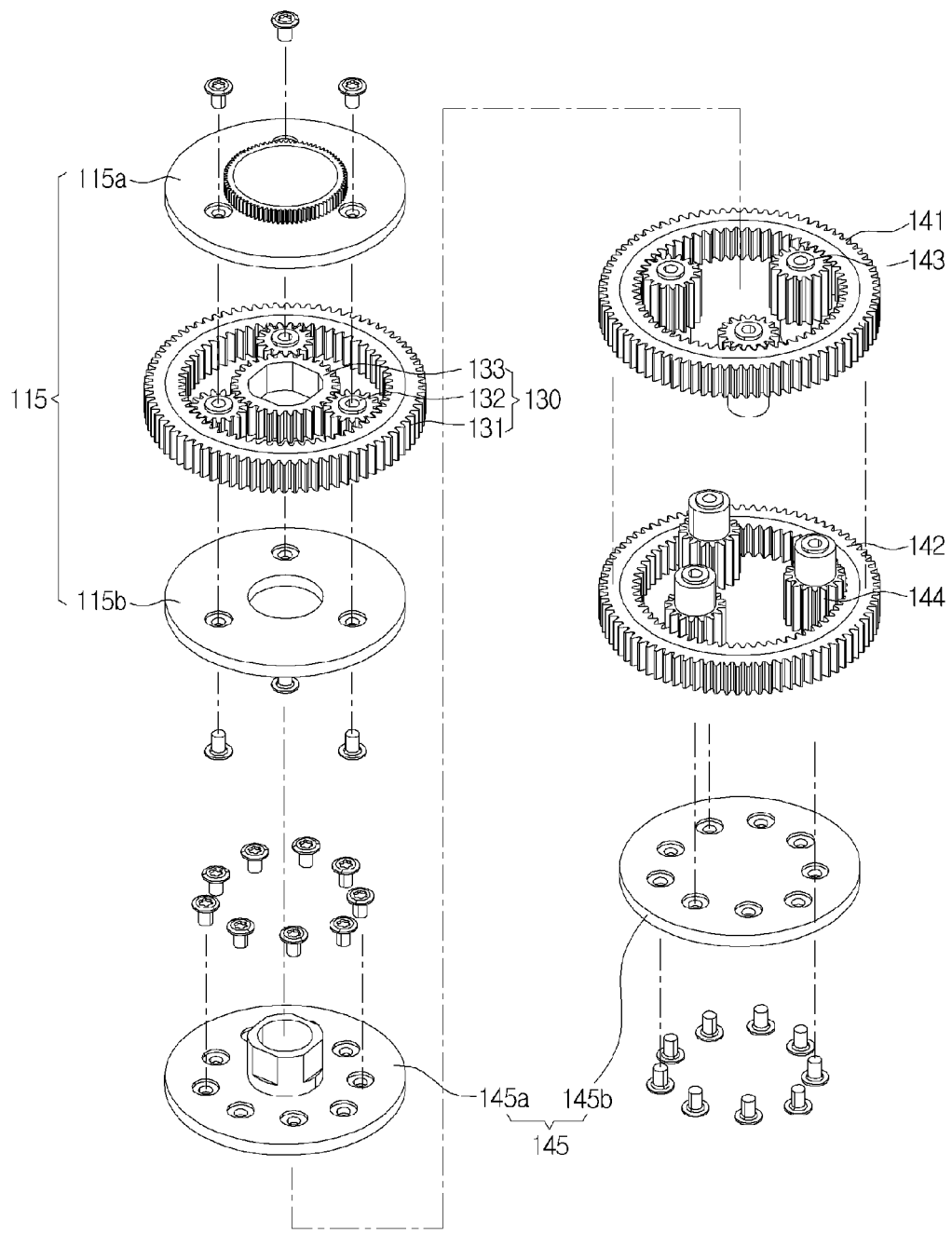
FIG. 3 is an exploded schematic skewed view of a differential gear of a robot using a multi-output differential gear.
Figure 4:
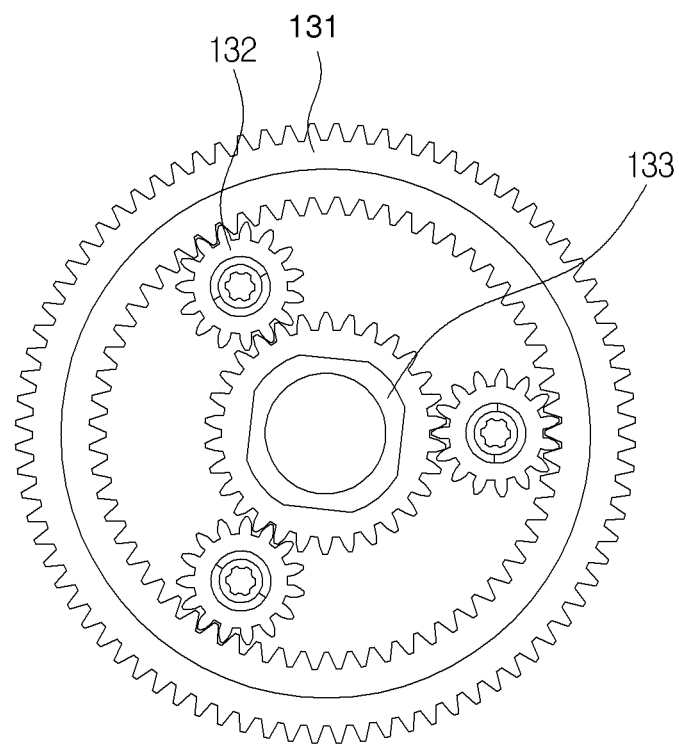
FIG. 4 is a schematic plane view of a first differential gear of a robot using a multi-output differential gear.
Figure 5:
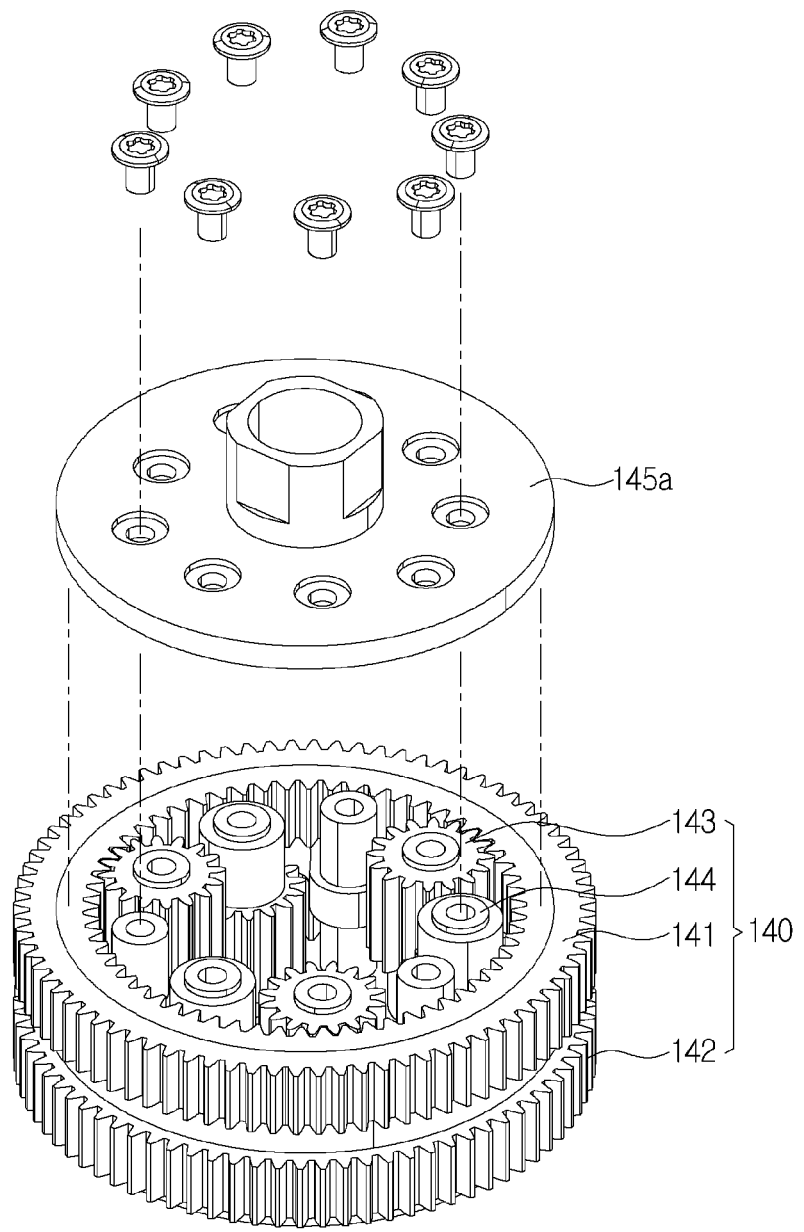
FIG. 5 is an exploded schematic skewed view of a second differential gear of a robot using a multi-output differential gear.
Figure 6:
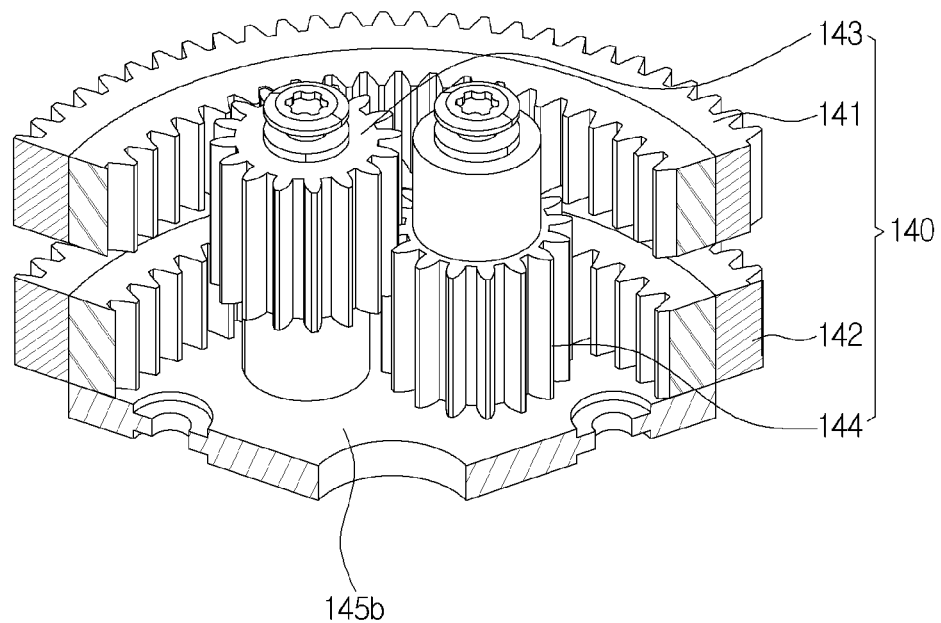
FIG. 6 is a schematic cross-sectional view illustrating a relationship of a second differential gear of a robot using a multi-output differential gear.
Figure 7:
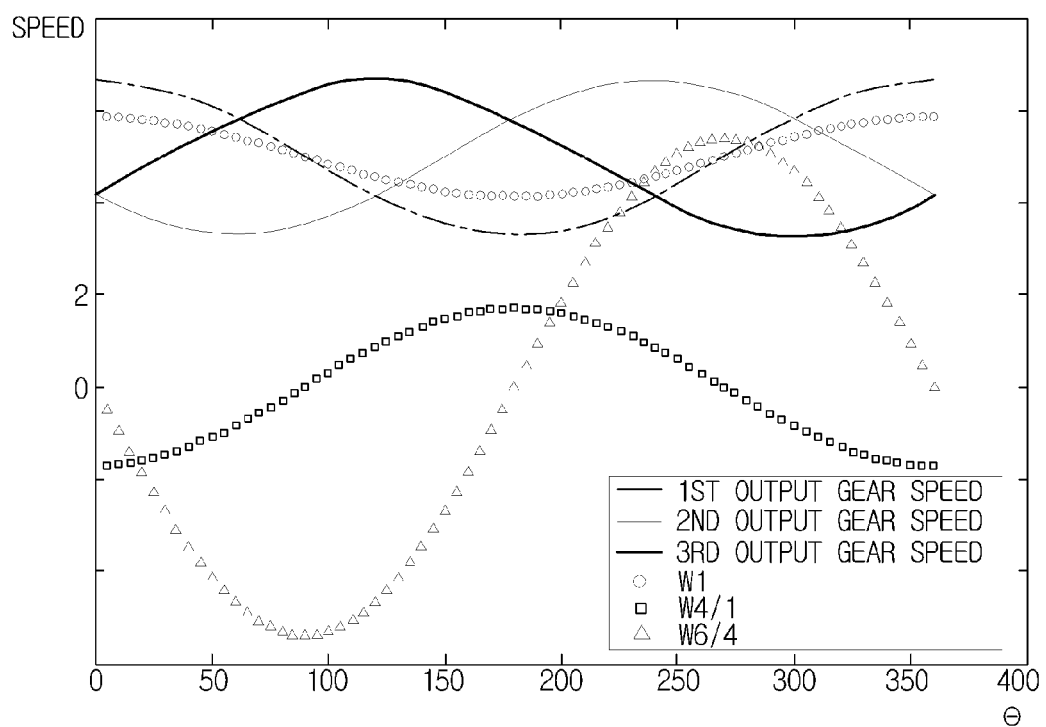
FIG. 7 is an experiment graph of speeds differentiated by a differential gear in a robot using a multi-output differential gear of FIG. 1.
Figure 8:
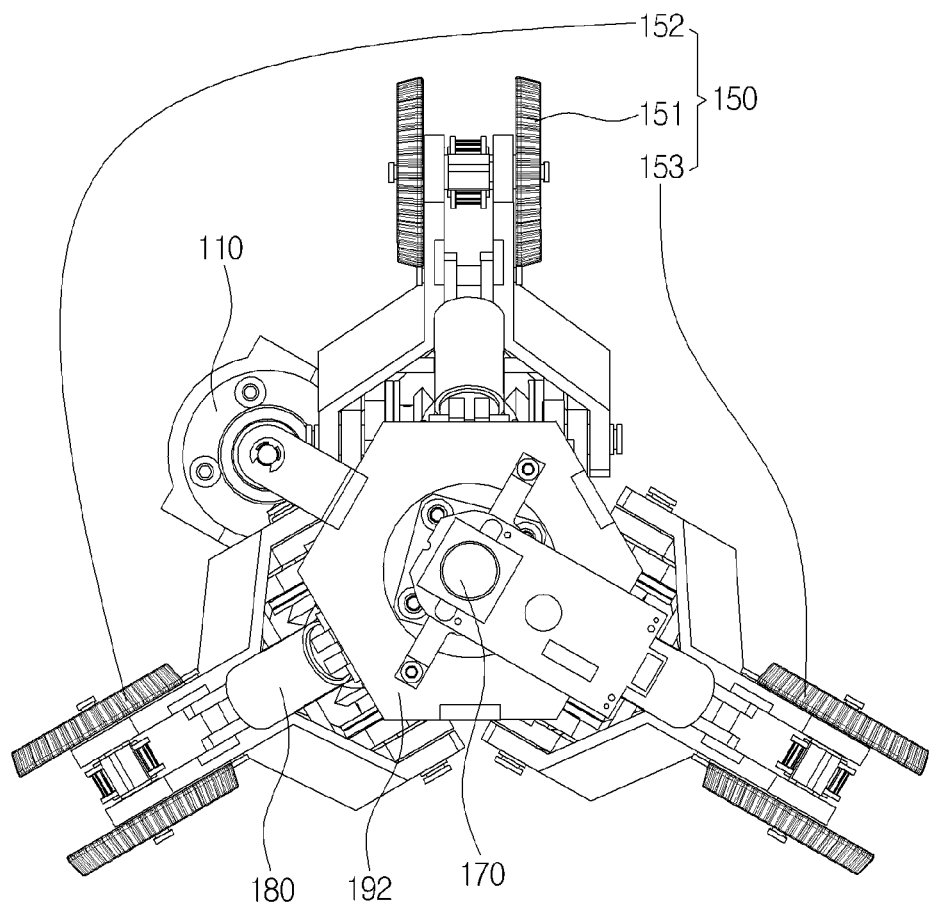
FIG. 8 is a schematic plane view of a robot using a multi-output differential gear of FIG. 1.
Figure 9:
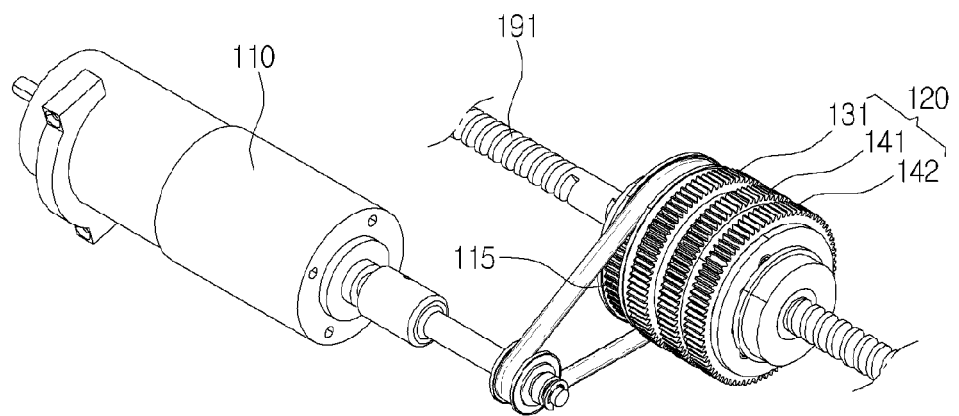
FIG. 9 is a schematic skewed view illustrating a relationship between a driver and a differential gear in a robot using a multi-output differential gear of FIG. 1.
Figure 10:
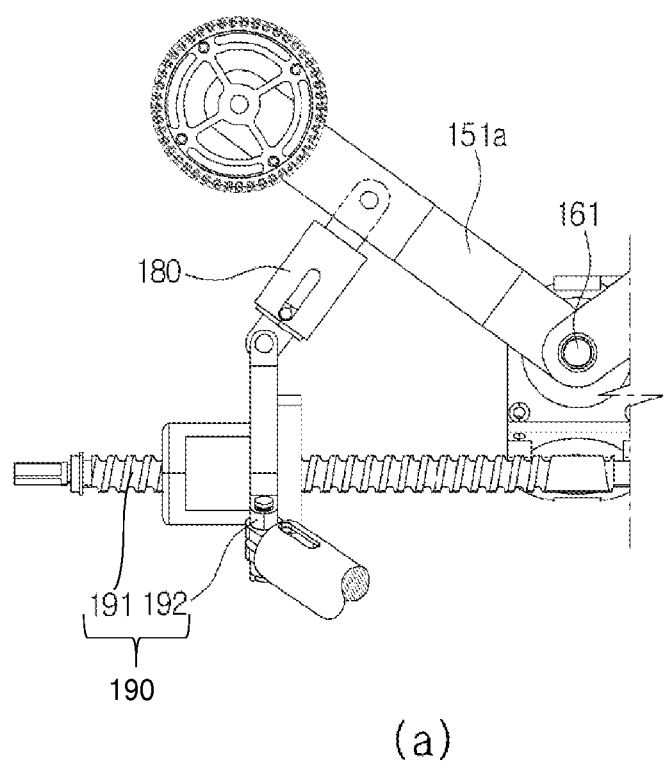
FIG. 10 is a schematic front view illustrating how an initial position of a motion section is adjusted by a buffering adjuster in a robot using a multi-output differential gear of FIG. 1.
Figure 10:
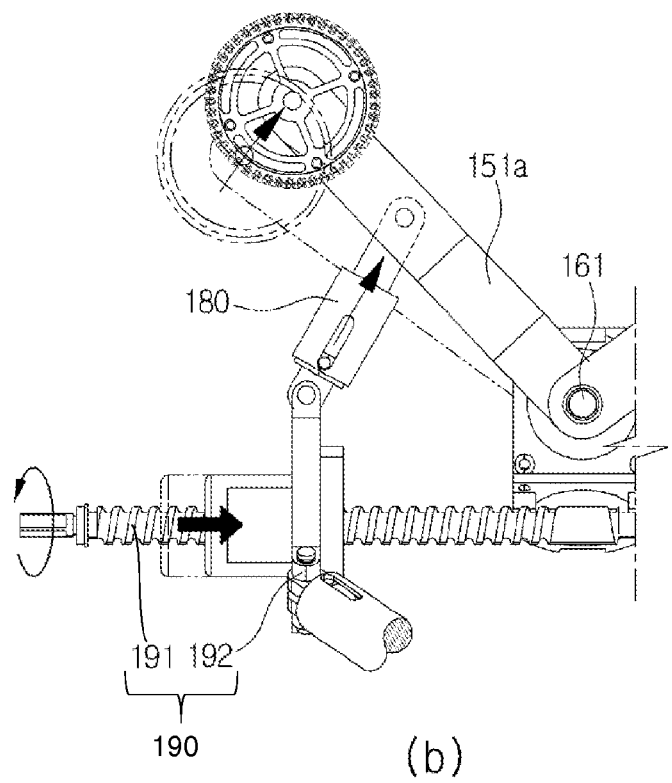
Figure 11:
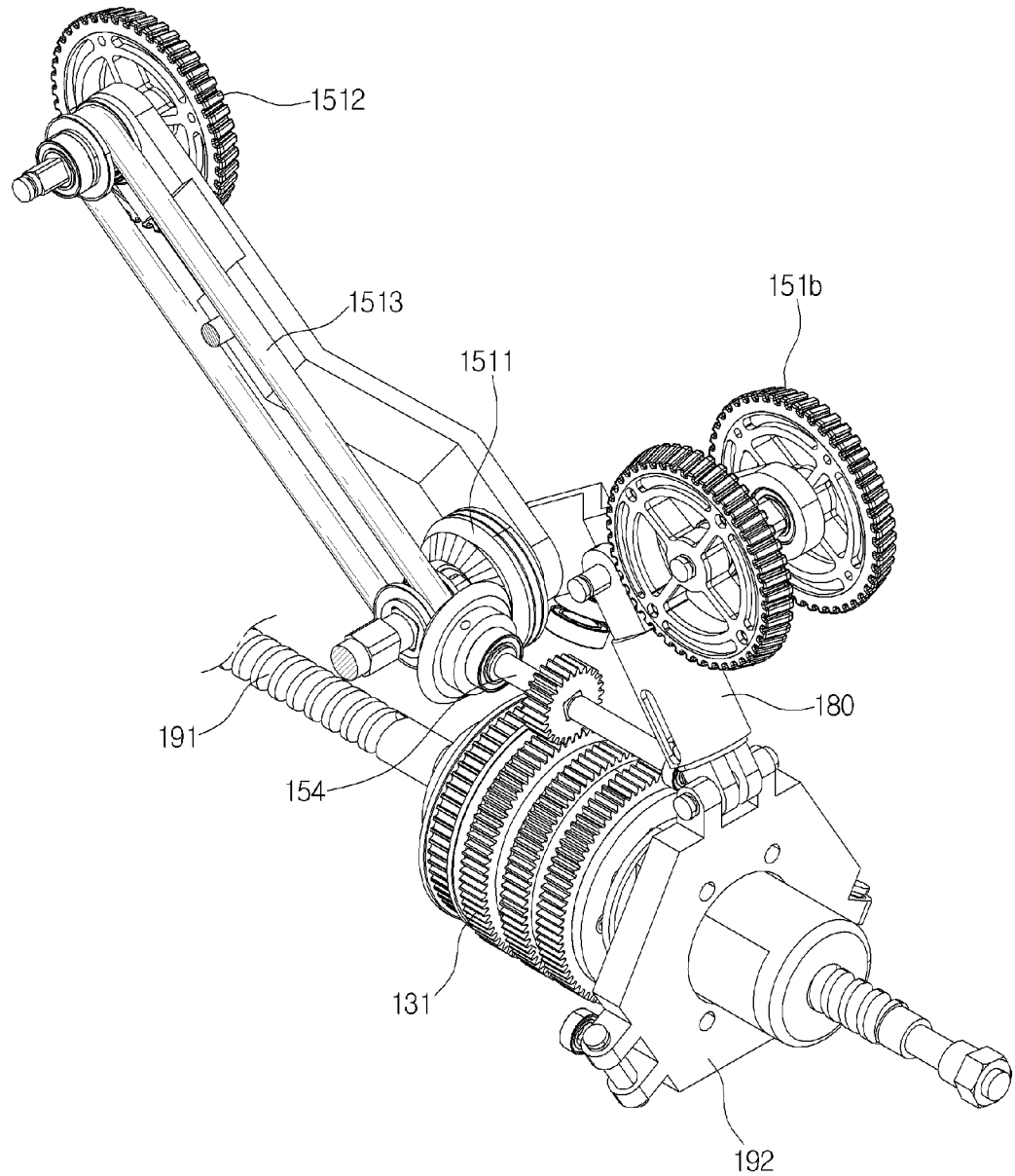
FIG. 11 is schematic skewed view illustrating a connection relationship between a differential gear and a motion section in a robot using a multi-output differential gear of FIG. 1.

FIG. 1 is a schematic skewed view of a robot using a multi-output differential gear according to a first exemplary embodiment of the present disclosure, FIG. 2 is a schematic skewed view of a differential gear of a robot using a multi-output differential gear of FIG. 1, FIG. 3 is a schematic exploded skewed view of a differential gear of a robot using a multi-output differential gear of FIG. 1, FIG. 4 is a schematic plane view of a first differential gear of a robot using a multi-output differential gear of FIG. 1, FIG. 5 is an exploded schematic skewed view of a second differential gear of a robot using a multi-output differential gear of FIG. 1, FIG. 6 is a schematic cross-sectional view of a combination relationship of a second differential gear of a robot using a multi-output differential gear of FIG. 1, FIG. 7 is an experiment graph conducted for speeds differentiated by a differential gear in a robot using a multi-output differential gear of FIG. 1, FIG. 8 is a schematic plane view of a robot using a multi-output differential gear of FIG. 1, FIG. 9 is a schematic skewed view illustrating a connection relationship between a driver and a differential gear in a robot using a multi-output differential gear of FIG. 1, FIG. 10 is a schematic front view illustrating how an initial position of a motion section is adjusted by a buffering adjuster in a robot using a multi-output differential gear of FIG. 1, and FIG. 11 is schematic skewed view illustrating a connection relationship between a differential gear and a motion section in a robot using a multi-output differential gear of FIG. 1.

With reference to FIGS. 1 to 11, in a robot using a multi-output differential gear according to the first exemplary embodiment of the present disclosure 100, each output gear of the multi-output differential gear 120 in an interlocked manner regarding one another to adjust the speed even when there exists an element that changes a movement path inside a pipe, thereby enabling stable driving. The robot 100 comprises a driver 110, differential gear 120, motion section 150, body section 160, camera module 170, buffering section 180, and buffering adjuster 190.

The driver 110 applies a driving power to a robot using a multi-output differential gear according to the first exemplary embodiment of the present disclosure 100. In this exemplary embodiment 100, a belt is used to transmit the driving power from the driver 110 to the differential gear 120 which will be explained hereinafter, but this is not limited to a belt, but the driver 110 and the differential gear 120 may directly engage each other so that the driving power may be transmitted from the driver 110 to the differential gear 120. Meanwhile, the driver according to the first exemplary embodiment of the present disclosure 100 is a well known technology, and thus detailed explanation thereof is omitted.

With reference to FIGS. 2 to 6, the differential gear 120 may receive the driving power from the driver 110 and transmit the driving power to three output gears, and an external resistance applied to a motion section 150 which will be explained hereinafter may cause a differential motion to occur. A robot using a multi-output differential gear according to the first exemplary embodiment of the present disclosure 100 comprises a first differential gear 130 and a second differential gear 140, and it is desirable that the first differential gear 130 and the second differential gear 140 have the same central axis 105.

The first differential gear 130 transmits the driving power received from the driver 110 to the motion section 150, and when an external resistance is applied from the motion section 150, each gear of the first differential gear 130 drives in an interlocked manner and generates a first output having a different rotary speed from the driving power applied from the driver 110 and transmits the generated first output to the motion section 150. In addition, a middle output having a reduced rotary speed than the driving power is transmitted from a middle gear 133 to the second differential gear 140. The first differential gear 130 according to the first exemplary embodiment of the present disclosure comprises a first output gear 131, three first epicyclic gears 132, and a middle gear 133.

Meanwhile, the first differential gear 130 may further comprise a drive transmitter 115 configured to receive the driving power from the driver 110 and transmit the driving power to the first epicyclic gear 132. The drive transmitter 115 may comprise, but is not limited to, a spur gear provided at one end that is adjacent to the driver 110 to receive the driving power from the driver 110.

That is, the first differential gear 130 generates a first output having a different rotary speed from the driving power at the same time of receiving the external resistance from the motion section 150, and generates a middle output having a reduced rotary speed than the driving power. Herein, the extent of reduction of the rotary speed depends on the gear ratio of the differential gears. That is, in the case where the first output gear 131 is interlocked with the middle gear 132, the first output that is transmitted to the middle gear 133 is equivalent to the ratio of the number of sawteeth provided in an inner circumference of the first output gear 131 to the number of sawteeth of the middle gear 133. This will be explained in further detail hereinafter in the description about an operating method according to a first exemplary embodiment of the present disclosure.

The first output gear 131 has sawteeth in its inner circumference and outer circumference, and the sawteeth of the inner circumference engage the first epicyclic gear 132, and the sawteeth of the outer circumference receives the external resistance and transmits a first output to a first motion section 151 that will be explained hereinafter. That is, the sawteeth of the outer circumference drive in an interlocked manner with the external resistance at same time of receiving the external resistance, to transmit the first output having a different rotary speed from the driving power to the first motion section 151.

The first epicyclic gear 132 engages the inner circumference of the first output gear 131, such that three of them are disposed around a central axis 105 of the first differential gear 130 at 120° from one another. The first epicyclic gear 132 transmits the first output where the external resistance received from the first output gear 131 has been considered to the middle gear 123 that will be explained hereinafter. However, the number or disposition of the first epicyclic gears 132 is not limited to the present disclosure, but may be selected when necessary.

The middle gear 133 does not rotate when there is no external resistance, whereas when an external resistance is received, the middle gear 133 drives in an interlocked manner with the first output gear 131 and transmits a middle output having a reduced rotary speed than the driving power to the second differential gear 140.

Regarding the combination relationship of the first differential gear 130, with reference to FIG. 4, each of the three first epicyclic gears 132 engage the inner circumference of the first output gear 131, and the middle gear 133 is disposed inside the first epicyclic gears 132 such that the first epicyclic gears 132 engage the outer circumference. In other words, the three first epicyclic gears 132 engage the outer circumference of the middle gear 133, and the first output gear 131 is disposed such that the sawteeth formed in the inner circumference engage the first epicyclic gears 132. Herein, it is desirable that the first output gear 131 has the same central axis 105 as the middle gear 133.

As aforementioned, according to the first exemplary embodiment of the present disclosure, drive transmitters 115a, 115b may be formed between the driver 110 and the first differential gear 130, so as to secure the position such that each of the first epicyclic gears 132 rotates individually, thereby performing a middle role so as to transmit the driving power from the driver 110 to the first epicyclic gears 132, but this is not limited thereto.

With reference to FIG. 5, the second differential gear 140 receives the middle output from the middle gear 133 and generates an output outside through the second output gear 141 and the third output gear 142, and when an external resistance is received from the motion section 150, the gears of the second differential gear 140 drive in an interlocked manner to generate a second output having a different rotary speed from the middle output and a third output having a different rotary speed than the second output through the second output gear 141 and the third output gear 142. The second differential gear 140 according to the first exemplary embodiment of the present disclosure comprises a second output gear 141, third output gear 142, second epicyclic gear 143 and third epicyclic gear 144.

When an external resistance is not received from a second motion section 152 or third motion section 153 to be explained hereinafter, the same output as the middle output is generated through each of the second output gear 141 and the third output gear 142, and whereas when an external resistance is received from the second output gear 141 or the third output gear 142, a second output having a different rotary speed from the middle output is generated through the second output gear 141, and the third output gear 142 drives in an interlocked manner with the second output gear 141 to generate a third output differentiated from the second output.

Furthermore, when there is no middle output and when an external resistance is transmitted towards the second output gear 141, the second output gear 141, second epicyclic gear 143 and third epicyclic gear 144 drive in an interlocked manner, thereby rotating the third output gear 142 in an opposite direction to the rotating direction of the second output gear 141.

The second output gear 141 is provided with sawteeth in its inner and outer circumferences, and the sawteeth of the inner circumference engage the second epicyclic gear 143, and the sawteeth of the outer circumference transmit the second output to the second motion section 152. That is, the sawteeth formed in the outer circumference of the second output gear 141 drive in an interlocked manner with the external resistance at the same time of receiving the external resistance from the second motion section 152, transmitting the second output having a different rotary speed than the middle output to the second motion section 152.

The third output gear 142 is provided with sawteeth in its inner and outer circumferences, and the sawteeth of the inner circumference engage the third epicyclic gear 144, whereas the sawteeth of the outer circumference transmit the third output to the third motion section 153. That is, the sawteeth formed in the outer circumference of the third output gear 142 drive in an interlocked manner with the external resistance at the same time of receiving the external resistance from the third motion section 153, transmitting the third output having a different rotary speed than the driving power to the third motion section 153.

Three second epicyclic gears 143 engage the inner circumference of the second output gear 141 and each of the third epicyclic gears 144, such that they are arranged at 120° from one another around the central axis 105 of the second differential gear 140. The second epicyclic gears 143 transmit the external resistance received from the second output gear 141 to the third epicyclic gears 144 to be explained hereinafter. However, the number and arrangement of the second epicyclic gears 143 are not limited to the present disclosure, but may obviously be selected when necessary.

The three third epicyclic gears 144 engage the inner circumference of the third output gear 142 and the second epicyclic gear 143, such that they are arranged at 120° from one another around the central axis 105 of the second differential gear 140. The third epicyclic gear 144 transmits the external resistance received from the third output gear 142 to the second epicyclic gear 143. Meanwhile, it is desirable that the number and arrangement of the third epicyclic gears 144 are selected in accordance with the second epicyclic gears 143.

An external resistance may be received from the second motion section 152 and the third motion section 153 at the same time, in which case the second output gear 141, third output gear 142, second epicyclic gear 143 and third epicyclic gear 144 drive in an interlocked manner to one another, and this can be regarded as the external resistances received from the second motion section 152 and the third motion section 153 as being offset or reinforced by one another, which is the same as the external resistance being received in one of the second motion section 152 and third motion section 153.

As illustrated in FIG. 5 or FIG. 6, regarding the combination relationship of the second differential gear 140, the sawteeth formed in the inner circumference of the second output gears 141 engage the second epicyclic gears 143 each of which engages its corresponding third epicyclic gear 144. Furthermore, the third epicyclic gears 144 engage the sawteeth formed in the inner circumference of the third output gear 142. However, since only a portion of the second epicyclic gear 143 and a portion of the third epicyclic gear 144 engage each other, it does not mean that the second epicyclic gear 143 and the third output gear 142 directly engage each other or that the third epicyclic gear 144 and the second output gear 141 directly engage each other. However, even by this combination, it is desirable that the second output gear 141 and the third output gear 142 are disposed such that they are distanced from each other.

Meanwhile, according to the first exemplary embodiment of the present disclosure 100, it is desirable that a middle output transmitter 145a, 145b is formed between the first differential gear 130 and the second differential gear 140. The middle output transmitter 145a, 145b is connected to the middle gear 133 and secures the position of the second epicyclic gears 143 and third epicyclic gears 144 such that each of them may rotate separately from one another, and, when a middle output is generated, performs a role of transmitting the middle output to the second epicyclic gear 143.

The motion section 150 drives in an interlocked manner with the output gears, and rotates as it receives the output from the output gears, and receives the external resistance generated during the movement and transmits the generated external resistance to each output gear. The motion section 150 according to the first exemplary embodiment of the present disclosure comprises a first motion section 151, a second motion section 152, and a third motion section 153.

With reference to FIG. 11, the first motion section 151 rotates as it receives a driving power or a first output from the first output gear 131, and when a cause for external resistance such as that there is formed a motion section in a movement path inside the pipe, transmits the external resistance to the first output gear 131.

According to the first exemplary embodiment of the present disclosure 100, the first motion section 151 consists of a pair of wheels so as to support both ends of the robot 100, one of which 151a is extended from a first intersection 161 of the body section 160 that will be explained hereinafter and is disposed obliquely towards the front of the differential gear, and the other 151b disposed obliquely towards the rear of the differential gear.

Meanwhile, by way of example, the first motion section 151 according to the first exemplary embodiment of the present disclosure 100 may comprise a first output direction converter 1511, a first wheel 1512, and a first belt 1513. The first output direction converter 1511 may comprise two bevel gears disposed at the body section 160 such that they face each other at a first intersection 161 where two first motion sections 151 intersect and engage the bevel gear of the first output transmitting gear 154, and a spur gear disposed between the two bevel gears to rotate together with the bevel gears. The first wheel 1512 may comprise a spur wheel provided between the two wheels facing each other so as to rotate together with the two wheels. The first belt 1513 connects the spur gear of the first out direction converter 1511 and the spur gear of the first wheel 1513 so that the two spur gears can drive in an interlocked manner.

The first output gear 131 engages the spur of the first output transmitting gear 1511, and the bevel gear of the first output transmitting gear 1511 is extended up to the first intersection and engages the bevel gear of the first output direction converter 1512.

Furthermore, the spur gear of the first output direction converter 1512 and the spur gear of the first wheel 1513 are connected to each other by the first belt 1514 so as to drive in an interlocked manner.

However, such a configuration is an example of a structure configured such that an output is transmitted from the differential gear 120 to the motion sector 150 according to the first exemplary embodiment of the present disclosure 100, and thus there is no limitation thereto.

Meanwhile, an operating method of the first motion section 151 will be explained in detail in the description on the first exemplary embodiment of the present disclosure 100 that will be explained hereinafter, and thus further detail is omitted.

The second motion section 152 and the third motion section 153 have the same configuration as the first motion section 151, and thus explanation on further detail is omitted, except that the second motion section 152 receives the second output and transmits the external resistance through the second output gear 141, and the third motion section 153 receives the third output and transmits the external resistance through the third output gear 142.

Furthermore, the first motion section 151, second motion section 152 and third motion section 153 according to the first exemplary embodiment of the present disclosure 100 are distanced by 120° from one another around the central axis of differential gear 120, the motion sections 151a, 152a, 153a are disposed in the front 105 of the differential gear 120 on the same concentric circle, and the motion sections 151b, 152b, 153b are disposed in the rear of the differential gear 120 are on the same concentric circle.

Furthermore, it is desirable that the diameter of the concentric circle formed by the motion sections 151a, 152a, 153a disposed in the front of the differential gear 120 is identical as the diameter of the concentric circle formed by the motion sections 151b, 152b, 153b disposed in the rear of the differential gear 120.

However, there is no limitation to the aforementioned disposition, and thus the disposition may be changed according to the user's intentions.

With reference to FIG. 8, the body section 160 is mounted to the outer surface of the differential gear 120 to protect and support the differential gear 120. That is, the body section 160 is provided with the differential gear 120 in its inside and a motion section 150 in its outside so as to enable an efficient process of transmitting an output from the differential gear 120 to the motion section 150 or from the motion section 150 to the differential gear 120.

With reference FIG. 8, the camera module 170 is provided in the front of the body section 160 to photograph an environment of the movement path of the robot. That is, the camera module 170 informs the user whether the path inside the pipe is a bent or straight etc.

With reference to FIG. 8 or FIG. 10, the buffering section 180 is connected to the motion section 150, and adjusts the distance between the motion section 150 and the differential gear 120 so as to keep the motion section 150 in contact with the inner wall of the pipe. According to the first exemplary embodiment of the present disclosure 100, the buffering section 180 adjusts the distance between the motion section 150 and the differential gear 120 according to changes of the movement path inside the pipe by adjusting the angle between the motion section 150 and the central axis 105 of the differential gear 120, but there is no limitation thereto.

That is, in the case where inside of the pipe is straight, the motion section 150 and the inside wall of the pipe can be kept contacting each other without having to adjust the distance between the motion section 150 and the differential gear 120. However, when inside the pipe is bent, the distance between the motion section 150 and the differential gear 120 has to be adjusted in order to keep the motion section 150 and the inner wall of the pipe contacting each other. According to the first exemplary embodiment of the present disclosure 100, the buffering section 180 is, but is not limited to, a spring damper.

With reference to FIG. 10, the buffering adjuster 190 adjusts the buffering section 180 to adjust the initial distance between the motion section 150 and the differential gear 120. According to the first exemplary embodiment of the present disclosure 100, the buffering adjuster 190 may comprise a ball screw 191 provided along the central axis 105 of the differential gear 120 and a buffering connector 192 configured to move along the ball screw 191 and connected to one side of the buffering section 180, and adjusts the position of the buffering connector 192 along the ball screw 191 so as to adjust the initial distance between the motion section 150 and the differential gear 120.

Regarding the combination relationship between the motion section, buffering section 180 and buffering adjuster 190 according to the first exemplary embodiment of the present disclosure 100, a buffering adjuster 190 is disposed inside the body section 160 around the central axis 105 of the differential gear 120, and each buffering section 180 is combined with the buffering connector 192 at its one end, the other end being connected to the first motion section 151, second motion section 152, and third motion section 153. In the buffering adjuster 190, when the buffering connector 192 moves along the ball screw 191, the angle of the first motion section 151, second motion section 152, and third motion section 153 connected to the buffering section 180 and the central axis of the differential gear 120 either increases or decreases. That is, the length of the motion section 150 is constant, but the angle between the motion section and the central axis 105 changes, thereby changing the distance between the differential gear 120 and the motion section 150.

In addition, it is possible to adjust the number of the buffering adjuster 190 according to the number of the motion sections 150 that drive in an interlocked manner with the buffering adjuster 190, but it is desirable to have one buffering adjuster 190 considering the size of the robot.

However, the buffering adjuster 190 is not limited to such a buffering adjuster 190 explained in the first exemplary embodiment of the present disclosure 100, but may obviously be formed differently depending on the user's intentions.

Hereinbelow is explanation on an operation of a robot using such a multi-output differential gear mentioned above according to a first exemplary embodiment 100.

First of all, hereinbelow is explanation on an operation of the differential gear 120, where a driving power and external resistance is received, a differentiation is made, and the differentiated output value is transmitted to the motion section 150.

First of all, hereinbelow is explanation on an operation of the first differential gear 130. In the case where an external resistance is not transmitted from the first motion section 151 to the first output gear 131, the driving power transmitted from the driver 110 is transmitted to the first epicyclic gear 132 by the drive transmitter 115a, 115b, and the first epicyclic gear 132 rotates the first output gear 131 in the same rotation direction as that of the driver 110 as it rotates along the outer circumference of the middle gear 133. Herein, the rotary speed depends on the ratio of the number of sawteeth of the first output gear 131 and the number of sawteeth of the first epicyclic gear 132.

In this case, the middle gear 133 is at a still state, and thus the middle output value is 0. The second differential gear 140 also falls at a still state if there is no external resistance received.

However, when an external resistance is transmitted to the first output gear 131, the first output gear 131 generates a first output having a rotary speed different from the rotary speed of the external power, and the gears of the first differential gear 130 drive in an interlocked manner, generating a middle output in the middle gear 133. Accordingly, the middle gear 133 performs the function of differentiation regarding the external power.

Meanwhile, regarding an operation method of the second differential gear 140, if the middle output transmitted to the second differential gear 140 is 0, the second output and third output by the second output gear 141 and the third output gear 142 are affected by whether or not an external resistance is transmitted. When there is no external resistance received, a middle output is not transmitted to the second differential gear 140, and thus neither a second output or third output is generated, but when an external resistance is transmitted to the second output gear 141 or the third output gear 142, the second output gear 141 and third output gear 142 would rotate in an interlocked manner, generating a second output and a third output.

Herein, if a middle output is transmitted to the second differential gear 140 and an external resistance is transmitted to the second output gear 141, the second output gear 141 would generate a second output having a rotary speed different from that of the middle output, and the third output gear 142 that drives in an interlocked manner with the second output gear 141 would generate a third output having a rotary speed different from that of the second output.

On the other hand, even when an external resistance is transmitted to the third output gear 142, the third output gear 142 would perform the same operations as in the case where an external resistance is transmitted to the second output gear. And when an external resistance is transmitted to both the second output gear 141 and the third output gear 142, the external resistance would be offset or reinforced, and thus the second output gear and third output gear would operate in the same manner as in the case where an external resistance is transmitted to only one of the second output gear 141 and third output gear 142. That is, both the second output gear 141 and the third output gear 142 perform the function of differentiation.

The first output gear 131, second output gear 141, and third output gear 142 may have different rotary speed depending on the number of sawteeth of the gears that are interlocked, but may rotate in the same rotation direction. If the three output gears must rotate in the same direction at the same speed, the relative speed of the gears inside would be 0, but if each of the three output gears must rotate at a different speed from one another, that is, if the output gears perform the function of differentiation, the relative speed of each output gear would differ from one another. This could be explained by the mathematical formula below.

$$1. \begin{bmatrix} \omega_1 \\ \omega_{4/1} \\ \omega_{6/4} \end{bmatrix} = \begin{bmatrix} 1\left(\frac{n_3}{n_2}\right) & \left(-\frac{n_4}{n_3}\right) & 0 \\ 1 & 1 & \frac{n_6}{n_5} \\ 1 & 1 & -\left(\frac{n_6}{n_8}\right) \end{bmatrix}^{-1} \begin{bmatrix} \omega_2 \\ \omega_5 \\ \omega_8 \end{bmatrix}.$$

Herein, $\omega_1$ represents the rotary speed of the driving power transmitted from the driver 110, $\omega_2$ represents the rotary speed of the first output gear 131, $\omega_5$ represents the rotary speed of the second output gear 141, $\omega_8$ represents the rotary speed of the third output gear 142, $\omega_{4/1}$ represents the relative speed of the middle gear 133 to the driving power, and $\omega_{6/4}$ represents the relative speed of the second epicyclic gear 143 to the middle gear 133. Furthermore, $n_3$ represents the number of sawteeth of the first output gear 131, $n_4$ represents the number sawteeth of the middle gear 133, and $n_3$ represents the number of sawteeth of the first epicyclic gear 132. Furthermore, $n_6$ represents the number of sawteeth of the second epicyclic gear 143, $n_5$ represents the number of sawteeth of the second output gear 141, $n_7$ represents the number of sawteeth of the third epicyclic gear 144, and $n_8$ represents the number of sawteeth of the third output gear 142.

First of all, the speed of the first output gear, $\omega_2$, the speed of the second output gear, $\omega_5$, and the speed of the third output gear, $\omega_8$, are shown in lines, while the rotary speed of the external power, $\omega_1$, the relative speed of the middle gear to the external power, $\omega_{4/1}$, and the relative speed of the second epicyclic gear to the middle gear, $\omega_{6/4}$, are shown in dots that are connected. With reference to FIG. 7, it can be seen that differentiations are made as the relative speeds of the gears change according to θ.

Hereinafter is explanation on an operation of a robot using a multi-output differential gear according to an exemplary embodiment of the present disclosure based on the operation of the aforementioned differential gear 120.

First of all, when the path inside the pipe is straight, it can be assumed that there is no external resistance, and thus a first output of the same size of the driving power is transmitted from the first output gear 131 to the first motion section 151. Herein, since a second and third output are not generated from the second output gear 141 and third output gear 142, the second motion section 152 and third motion section 153 rotate at the same rotating speed as the first motion section.

Next, when the path inside the pipe is bent or has an obstacle and an external resistance is generated, the external resistance is transmitted from at least one of the first motion section 151, second motion section 152, and third motion section 153, and the rotary speed of each motion section 150 will differ according to the operation of the aforementioned differential gear 120.

Regarding the operation of the motion section 150 based on the case of the first motion section 151 according to a first exemplary embodiment of the present disclosure 100, with reference to FIG. 11, when the first output gear 131 rotates as it receives a driving power from the driver 110, the spur gear of the first output transmitting gear 154 rotates together with the first output gear 131, thereby rotating the bevel gear of the first output transmitting gear 154. Accordingly, the two bevel gears and the spur gear of the first output direction converter 1511 provided in the first intersection 161 rotate, and the spur gear of the first output direction transmitter 511 and the spur gear of the first wheel 1512 connected by the first belt 1513 also rotate together. And thus, the wheels of the first wheel 1512 rotate as well.

In addition, such an operation is made in the same manner in the second motion section 152 and third motion section 153 as well.

Meanwhile, with reference to FIG. 10, due to the curve inside the pipe, inertia is applied to the robot 100, and to correct this, the buffering section 180 operates individually. That is, when an inertia is applied to the robot 100 in the direction in which a centrifugal force is applied, the pipe wall in the subject direction and the robot 100 become close to each other, and thus the buffering section 180 connected to the motion section is compressed and compensates for the distance, and the buffering section 180 connected to the motion section formed in the opposite direction is loosened and compensates for the distance, thereby keeping the robot 100 and the inner wall of the pipe contacting each other even in such a bent pipe.

Furthermore, it is possible to adjust the buffering adjuster 190 in accordance with the inner diameter of the pipe to adjust the distance between the differential gear 120 and the motion section 130, so that the diameter of the concentric circle formed from each motion section 150 is at least the inner diameter of the pipe.

Next, hereinafter is explanation on a robot using a multi-output differential gear according to a second exemplary embodiment of the present disclosure.

Figure 12:
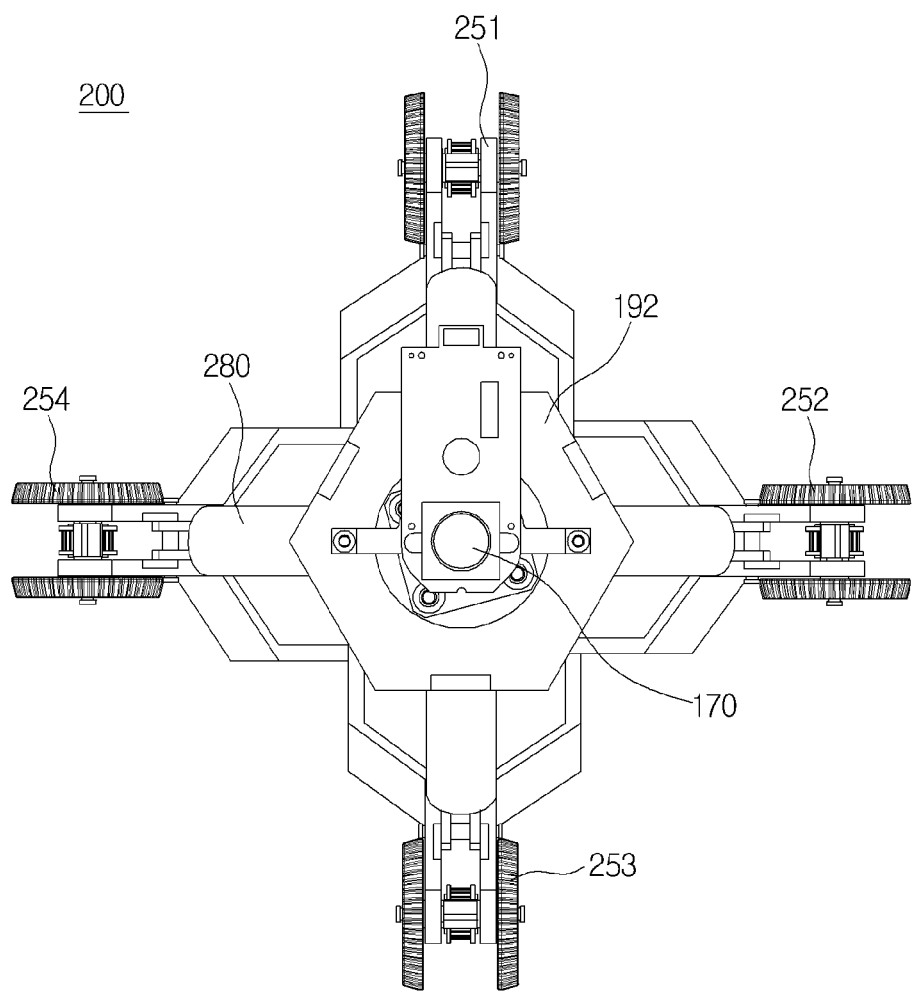
FIG. 12 is a schematic plane view of a robot using a multi-output differential gear according to a second exemplary embodiment of the present disclosure.
Figure 13:
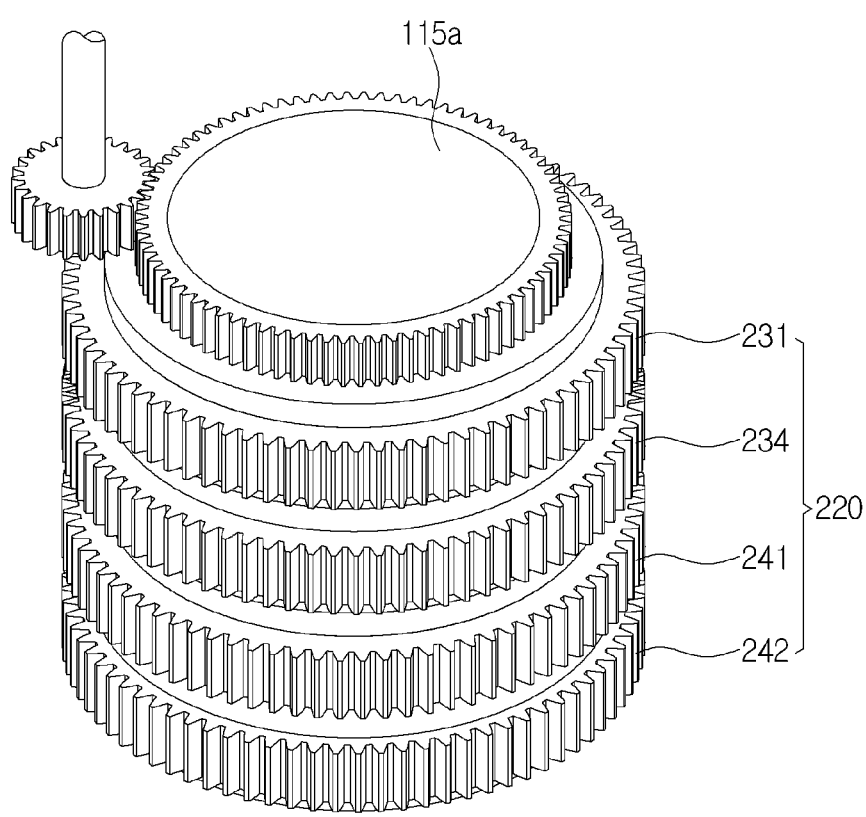
FIG. 13 is a schematic skewed view of a differential gear in a robot using a multi-output differential gear of FIG. 12.
Figure 14:
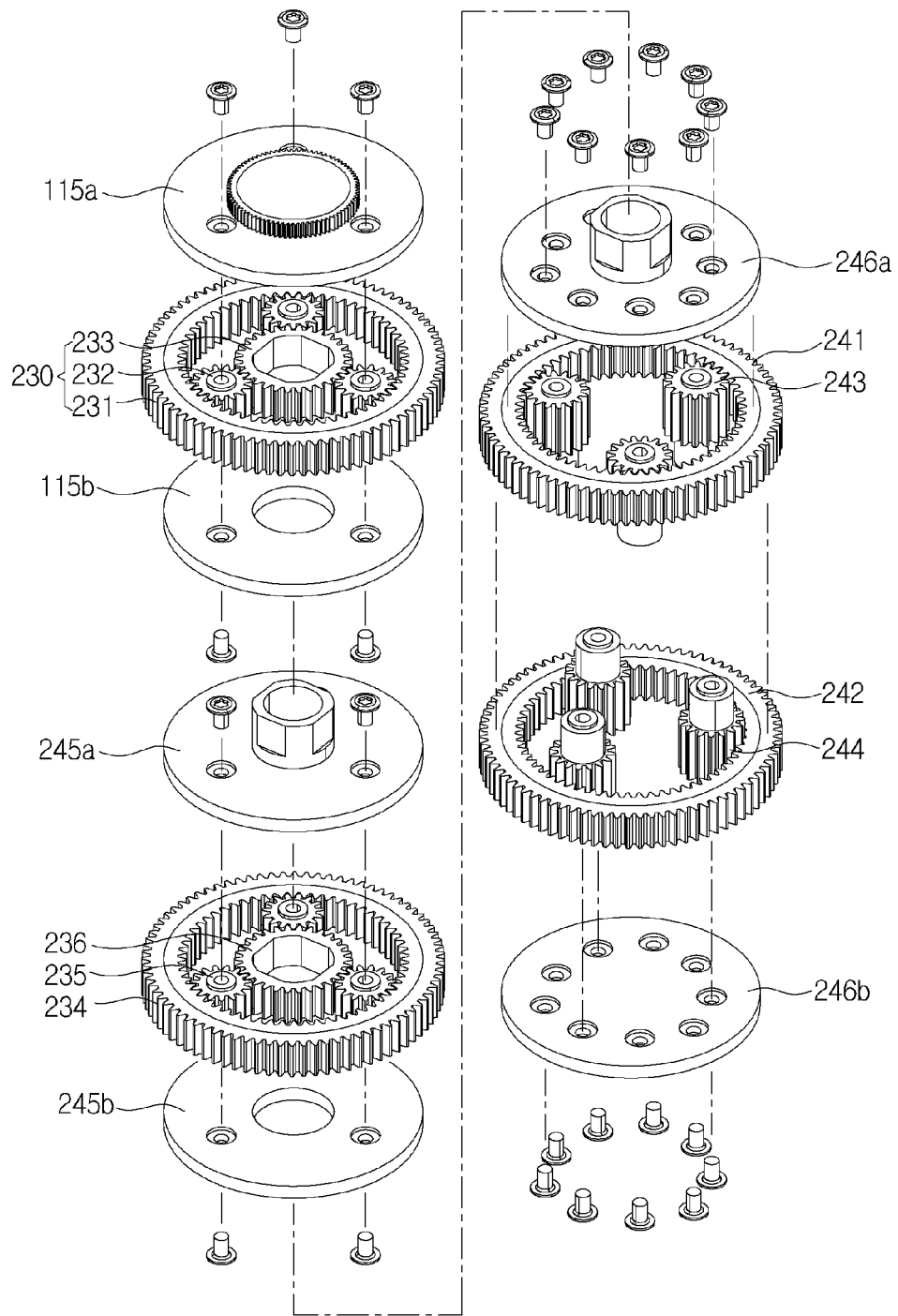
FIG. 14 is a schematic exploded skewed view of a differential gear in a robot using a multi-output differential gear of FIG. 12.

FIG. 12 is a schematic plane view of a robot using a multi-output differential gear according to an second exemplary embodiment of the present disclosure, FIG. 13 is a schematic skewed view of a differential gear in a robot using a multi-output differential gear of FIG. 12, and FIG. 14 is an exploded schematic skewed view of a differential gear in a robot using a multi-output differential gear of FIG. 12.

With reference to FIGS. 12 to 14, a robot using a multi-output differential gear according to a second exemplary embodiment of the present disclosure 200 comprises a driver 110, differential gear 220, motion section 250, body section 160, camera module 170, buffering section 280, and buffering adjuster 190.

The driver 110, body section 160, camera module 170, and buffering adjuster 190 are identical to those of the first exemplary embodiment of the present disclosure 100, and thus detailed explanation thereof is omitted.

The first differential gear 230 comprises a first output gear 231, three epicyclic gears 232, a first middle gear 233, a fourth output gear 234, three fourth epicyclic gears 235, and a second middle gear 236. Furthermore, there may be provided, but is not limited to, a first middle output transmitter 245a, 245b between the first middle gear 233 and the fourth epicyclic gear 234 to transmit the first middle output to the fourth epicyclic gear 235.

Furthermore, there may be provided, but is not limited to, a second middle output transmitter 246a, 246b between the second middle gear 236 and the second epicyclic gear 143 to transmit the second middle output from the second middle gear 236 to the second epicyclic gear 143.

Regarding the disposition of the first differential gear 230, the first differential gear 230 according to the second exemplary embodiment 200 comprises two first differential gears 130 of the first exemplary embodiment 100 disposed adjacently to each other. That is, in the second exemplary embodiment 200, a third differential gear having the same configuration as the first differential gear 130 is disposed between the first differential gear 130 and the second differential gear 140 of the first exemplary embodiment 100.

The motion section 250 drives in an interlocked manner with the first output gear 231, second output gear 141, third output gear 142, and fourth output gear 234. They rotate as they receive outputs from each of the output gears, and then receive the external resistance generated by the rotation and transmit the same to each of the output gears. The motion section 250 according to the second exemplary embodiment of the present disclosure 200 comprises a first motion section 251, second motion section 252, third motion section 253, and fourth motion section 254.

According to the second exemplary embodiment 200 of the present disclosure, the four motion sections 251, 252, 253, 254 are disposed, but are not limited to, such that each of them is distanced by 90° from one another around the central axis 105 of the differential gear 220. Meanwhile, regarding the motion sections, everything is the same as in each motion section 150 of the first exemplary embodiment besides the disposition relationship, and thus further detailed explanation is omitted.

There are provided four buffering sections 280 so as to correspond to the four motion sections, but beside this, everything regarding the buffering section is the same as in the first exemplary embodiment 100, and thus further detailed explanation is omitted Regarding the overall shape of a robot using a multi-output differential gear, compared to the first exemplary embodiment 100, in the second exemplary embodiment 200, the differential gear 220 has four output gears, and thus there are provided four motion sections 250 and four buffering sections 280 so as to correspond thereto.

Of course, the first differential gear 230 may comprise three or more output gears, additional epicyclic gears and middle gears, and additional motion sections and buffering sections corresponding thereto.

Hereinbelow is explanation on an operation method of a robot using a multi-output differential gear according to the second exemplary embodiment of the present disclosure 100.

The operation method of the second differential gear 240 is the same as in the first exemplary embodiment 100, except that the number of elements of the motion sections and buffering sections 280 increased.

Hereinafter is explanation on the operation of the first differential gear 230. The process of generating a driving power and a first middle output from the driver 110 to the first middle gear 233 is the same as in the first exemplary embodiment 100.

First, when a first middle output is generated from the first middle gear 223, it is transmitted to the fourth epicyclic gear 235 that drives in an interlocked manner with the first middle gear 223 by the second middle output transmitter. The first middle output transmitted to the fourth epicyclic gear 235 is converted into a second middle output in the second middle gear 236 depending on whether or not an external resistance is transmitted from the fourth output gear 234 as the fourth epicyclic gear 235, fourth output gear 234, and second middle gear 236 drive in an interlocked manner.

When an external resistance is transmitted to the fourth output gear 234, and a second middle output is generated from the second middle gear 236, such a second middle output is transmitted to the second differential gear 240, driving the second differential gear 240. The operation of the second differential gear 240 thereafter is the same as in the first exemplary embodiment 100, and thus further detailed explanation is omitted.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

DESCRIPTION OF REFERENCE NUMERALS

100: ROBOT USING MULTI-OUTPUT DIFFERENTIAL GEAR ACCORDING TO FIRST EXEMPLARY EMBODIMENT
110: DRIVER
120: DIFFERENTIAL GEAR
130: FIRST DIFFERENTIAL GEAR
140: SECOND DIFFERENTIAL GEAR
150: MOTION SECTION
160: BODY SECTION
170: CAMERA MODULE
180: BUFFERING SECTION
190: BUFFERING ADJUSTER
200: ROBOT USING MULTI-OUTPUT DIFFERENTIAL GEAR ACCORDING TO SECOND EXEMPLARY EMBODIMENT
220: DIFFERENTIAL GEAR
230: FIRST DIFFERENTIAL GEAR
240: SECOND DIFFERENTIAL GEAR
250: MOTION SECTION
260: BODY SECTION
280: BUFFERING SECTION
290: BUFFERING ADJUSTER

What is claimed is:

1. A robot using a multi-output differential gear, the robot comprising:
   a driver;
   a differential gear assembly configured to receive a driving power from the driver, receive at least one external resistance, and drive in an interlocked manner with the driving power to generate a plurality of outputs differentiated from the driving power, the differential gear assembly comprising:

a first differential gear set configured to receive the driving power from the driver and comprising
a first output gear configured to generate a first output among the plurality of outputs having a different rotary speed from the driver when receiving a first external resistance among the at least one external resistance,
a middle gear configured to drive in an interlocked manner with the first output gear to generate a middle output among the plurality of outputs, and
a second differential gear set configured to receive the middle output from the first differential gear set and comprising
a second output gear configured to generate a second output among the plurality of outputs having a different rotary speed from the middle output when receiving a second external resistance among the at least one external resistance, the second output gear comprising sawteeth in its inner circumference,
a plurality of second epicyclic gears engaging the inner circumference of the second output gear and driving in an interlocked manner with the second output gear,
a third output gear configured to drive in an interlocked manner with the second output gear to generate a third output among the plurality of outputs having a different rotary speed from the second output, the third output gear comprising sawteeth in its inner circumference, and
a third epicyclic gear engaging the second epicyclic gear and an inner circumference of the third output gear at the same time to rotate in an interlocked manner with the second epicyclic gear and third output gear; and
at least one motion section configured to drive in an interlocked manner with a respective output among the plurality of outputs generated from the differential gear assembly, and to apply a respective external resistance among the at least one external resistance to the differential gear assembly.

2. The robot according to claim 1, wherein the first output gear is provided with sawteeth in its inner circumference, the middle gear is provided inside of and distanced from the first output gear, and the first differential gear set further comprises a plurality of first epicyclic gears configured to engage the inner circumference of the first output gear and an outer circumference of the middle gear at the same time.

3. The robot according to claim 2,
further comprising a buffering section between each motion section among the at least one motion section and the differential gear assembly, the buffering section configured to adjust a distance between the respective motion section and the differential gear assembly in order to keep the respective motion section contacting a motion surface.

4. The robot according to claim 3,
further comprising a buffering adjuster interlocked with the buffering section and configured to adjust an initial distance between the respective motion section and the differential gear assembly.

5. The robot according to claim 1,
wherein at least one of the first output gear, second output gear, and third output gear is provided with sawteeth in its outer circumference, and
the sawteeth provided in an outer circumference of at least one of the first output gear, second output gear, and third output gear drive in an interlocked manner with a respective motion section among the at least one motion section to receive the respective external resistance.

6. The robot according to claim 5,
further comprising a buffering section between each motion section of the at least one motion section and the differential gear assembly, the buffering section configured to adjust a distance between the respective motion section and the differential gear assembly in order to keep the respective motion section contacting a motion surface.

7. The robot according to claim 6,
further comprising a buffering adjuster interlocked with the buffering section and configured to adjust an initial distance between the respective motion section and the differential gear assembly.

8. The robot according to claim 1,
wherein the at least one motion section comprises a first motion section configured to drive in an interlocked manner with the first output gear and apply the first external resistance to the first output gear, a second motion section configured to drive in an interlocked manner with the second output gear and apply the second external resistance to the second output gear, and a third motion section configured to drive in an interlocked manner with the third output gear and receive the third output from the third output gear.

9. The robot according to claim 8,
wherein the first, second and third motion sections are distanced by 120° from one another around a central axis of the differential gear assembly.

10. The robot according to claim 8,
wherein at least one of the first motion section, second motion section, and third motion section comprises a pair of motion sections extended from an outer surface of the differential gear assembly and distanced from each another along a longitudinal direction of the differential gear assembly.

11. The robot according to claim 1,
further comprising a body section mounted to an outer surface of the differential gear assembly to protect the differential gear assembly.

12. The robot according to claim 11,
further comprising a camera module mounted to a front portion of the body section.

13. The robot according to claim 1,
further comprising a buffering section between each motion section of the at least one motion section and the differential gear assembly, the buffering section configured to adjust a distance between the respective motion section and the differential gear assembly in order to keep the respective motion section contacting a motion surface.

14. The robot according to claim 13,
further comprising a buffering adjuster interlocked with the buffering section and configured to adjust an initial distance between the respective motion section and the differential gear assembly.

15. A robot using a multi-output differential gear, the robot comprising:
a driver;
a differential gear assembly configured to receive a driving power from the driver, and to drive in an interlocked manner with the driving power to generate a plurality of outputs differentiated from the driving power, the differential gear assembly comprising:
a first differential gear set configured to receive the driving power from the driver and comprising a first output gear configured to generate a first output among the plurality of outputs having a different rotary speed from the driver when receiving a first external resistance,
a middle gear configured to drive in an interlocked manner with the first output gear to generate a middle output among the plurality of outputs, and
a second differential gear set configured to receive the middle output from the first differential gear set and comprising
a second output gear configured to generate a second output among the plurality of outputs having a different rotary speed from the middle output when receiving a second external resistance, and
a third output gear configured to drive in an interlocked manner with the second output gear to generate a third output among the plurality of outputs having a different rotary speed from the second output;
a first motion section configured to drive in an interlocked manner with the first output gear and apply the first external resistance to the first output gear;
a second motion section configured to drive in an interlocked manner with the second output gear and apply the second external resistance to the second output gear; and
a third motion section configured to drive in an interlocked manner with the third output gear and receive the third output from the third output gear,
wherein the first, second and third motion sections are distanced by 120° from one another around a central axis of the differential gear assembly.

16. A robot using a multi-output differential gear, the robot comprising:
a driver;
a differential gear assembly configured to receive a driving power from the driver, and to drive in an interlocked manner with the driving power to generate a plurality of outputs differentiated from the driving power;
at least one motion section configured to drive in an interlocked manner with a respective output among the plurality of outputs generated from the differential gear assembly, and to apply at least one external resistance to the differential gear assembly;
a body section mounted to an outer surface of the differential gear assembly to protect the differential gear assembly; and
a camera module mounted to a front portion of the body section.

* * * * *